(12) United States Patent
Holgersson

(10) Patent No.: US 11,963,478 B2
(45) Date of Patent: Apr. 23, 2024

(54) METHOD FOR UPDATING A COLLISION DETECTION ALGORITHM IN A SELF-PROPELLED ROBOTIC TOOL

(71) Applicant: HUSQVARNA AB, Huskvarna (SE)

(72) Inventor: Jonas Holgersson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 686 days.

(21) Appl. No.: 16/972,411

(22) PCT Filed: Jun. 12, 2019

(86) PCT No.: PCT/EP2019/065322
§ 371 (c)(1),
(2) Date: Dec. 4, 2020

(87) PCT Pub. No.: WO2020/001978
PCT Pub. Date: Jan. 2, 2020

(65) Prior Publication Data
US 2021/0161065 A1    Jun. 3, 2021

(30) Foreign Application Priority Data

Jun. 26, 2018  (SE) .................................. 1850785-5

(51) Int. Cl.
*A01D 34/00*     (2006.01)
*A01D 101/00*    (2006.01)
(Continued)

(52) U.S. Cl.
CPC ............ *A01D 34/008* (2013.01); *B25J 9/162* (2013.01); *G05D 1/0212* (2013.01); *A01D 2101/00* (2013.01); *G05D 2201/0208* (2013.01)

(58) Field of Classification Search
CPC ... A01D 2101/00; A01D 34/008; B25J 9/162; G05B 2219/50393; G05D 1/0212; G05D 2201/0208
See application file for complete search history.

(56) References Cited

U.S. PATENT DOCUMENTS 8,428,776 B2 * 4/2013 Letsky ................. G05D 1/0274
                                                       700/245
8,706,297 B2 * 4/2014 Letsky ................. G05D 1/0274
                                                       700/245
(Continued)

FOREIGN PATENT DOCUMENTS

WO    2009132317 A1    10/2009
WO    2017218234 A1    12/2017
WO    2018000922 A1    1/2018

OTHER PUBLICATIONS

International Search Report and Written Opinion for International Application No. PCT/EP2019/065322 dated Oct. 7, 2019.
(Continued)

*Primary Examiner* — Babar Sarwar
(74) *Attorney, Agent, or Firm* — Burr & Forman LLP

(57) ABSTRACT

The present disclosure relates to a self-propelled robotic work tool (1), e.g. an automatic robotic lawn mower, and a corresponding method. The robotic tool comprises an inertia measurement unit (IMU 15) which generally obtains (25) measured IMU parameters regarding the robotic working tool's movement. A prediction algorithm (17) predicts (27, 36) required motor currents for driving the robotic work tool's wheels (5) based on the measured IMU parameters. The predicted motor current is compared (29,37) to the actual current used and the difference constitutes an error (19), which is used in a collision detection unit (21). If the collision detection unit (21) senses that the actually used motor current is much higher than the predicted current, a
(Continued)

collision may be indicated (31). The prediction algorithm is repeatedly updated based on the error (19) by incrementing or decrementing an error category counter (error cat, 41,45) if the error (19) is above or bellow a first or second threshold (39,43), and increasing or decreasing a prediction algorithm setting (49,53), e.g. a motor current offset term i offset—if the error category counter (error cat, 41,45) is above or bellow a third or fourth threshold (47,51). This allows the prediction algorithm to adapt to circumstances where the robotic tool is used. For instance, if a lawn mower operates in thick grass, the prediction algorithm can be adapted not to detect false collisions due to increased motor current values.

14 Claims, 3 Drawing Sheets

(51) Int. Cl.
*B25J 9/16* (2006.01)
*G05D 1/00* (2006.01)
*G05D 1/02* (2020.01)

(56) References Cited

U.S. PATENT DOCUMENTS

| | | | |
|---|---|---|---|
| 9,456,545 B2 * | 10/2016 | Biber | A01D 34/008 |
| 9,867,331 B1 * | 1/2018 | Siudyla | A01D 34/76 |
| 9,983,586 B2 * | 5/2018 | Borinato | A01D 34/008 |
| 11,422,565 B1 * | 8/2022 | Webster | B25J 13/088 |
| 11,582,903 B1 * | 2/2023 | Brown | G05D 1/02 |
| 2006/0020369 A1 | 1/2006 | Taylor et al. | |
| 2011/0202175 A1 | 8/2011 | Romanov et al. | |
| 2012/0245733 A1 | 9/2012 | Bjorn | |
| 2014/0316569 A1 * | 10/2014 | Monari | G05B 19/0425 700/255 |
| 2014/0324269 A1 * | 10/2014 | Abramson | G05D 1/0212 901/1 |
| 2015/0158174 A1 | 6/2015 | Romanov et al. | |
| 2015/0163993 A1 * | 6/2015 | Pettersson | A01D 34/008 701/28 |
| 2016/0096270 A1 | 4/2016 | Ibarz Gabardos et al. | |
| 2016/0100522 A1 * | 4/2016 | Yamauchi | G05D 1/0212 701/25 |
| 2016/0174459 A1 * | 6/2016 | Balutis | B25J 9/1674 701/25 |
| 2017/0020064 A1 | 1/2017 | Doughty et al. | |
| 2018/0103579 A1 * | 4/2018 | Grufman | G05D 1/027 |
| 2019/0216012 A1 * | 7/2019 | Hahn | A01D 34/84 |
| 2021/0116911 A1 * | 4/2021 | Pjevach | B60L 50/66 |

OTHER PUBLICATIONS

Swedish Office Action and Search Report for Swedish Application No. 1850763-2, dated Feb. 12, 2019.

* cited by examiner

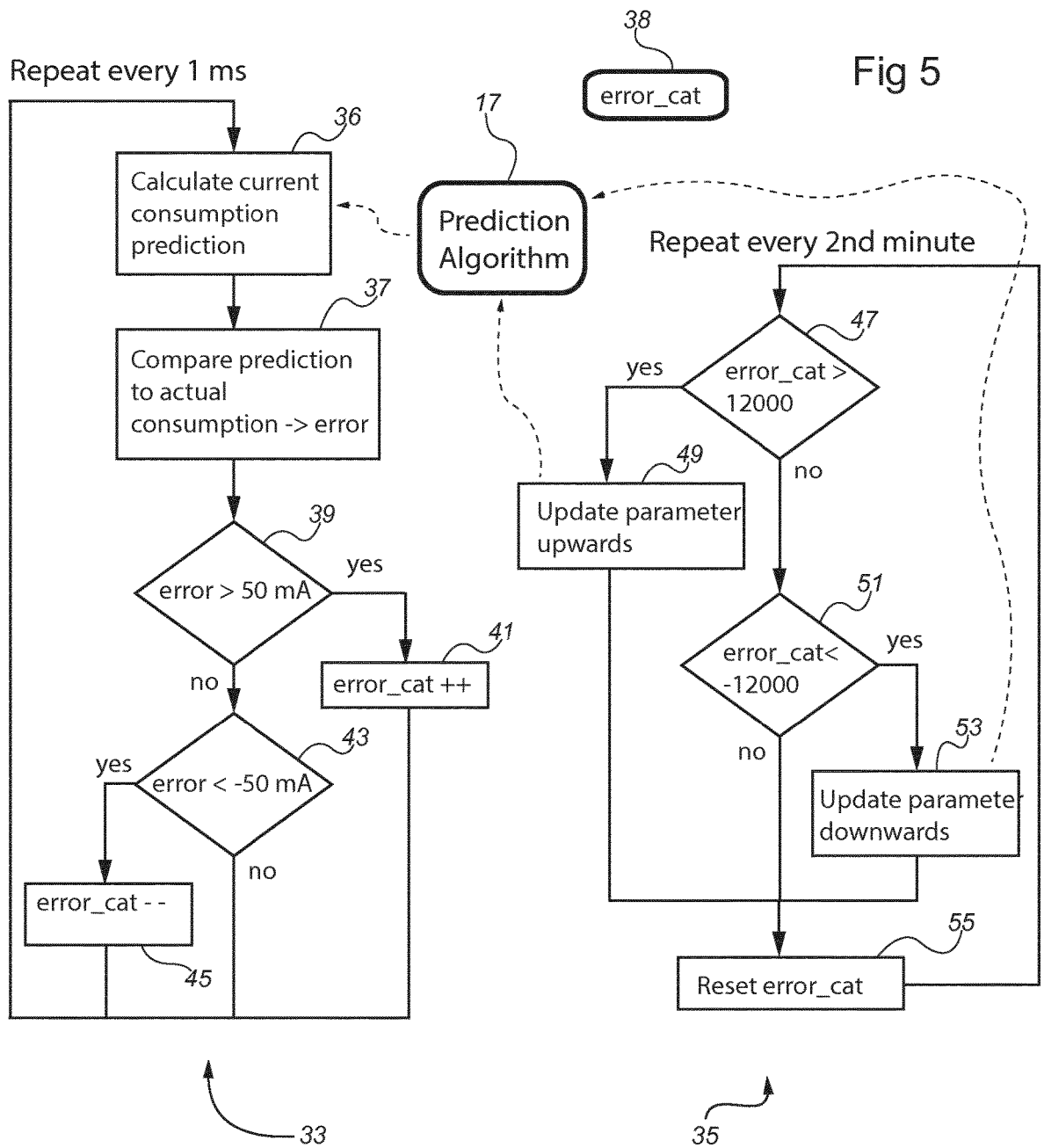

METHOD FOR UPDATING A COLLISION DETECTION ALGORITHM IN A SELF-PROPELLED ROBOTIC TOOL

FIELD OF THE INVENTION

The present disclosure relates to a method in a self-propelled robotic tool, comprising at least one driving wheel driven by an electric motor, wherein the method detects a collision with another object, and includes measuring IMU parameters, predicting required motor currents based on the measured parameters and a prediction algorithm, controlled by prediction algorithm parameters, comparing predicted currents with actual currents to provide a current error, and carrying out a collision detection based on the current error.

TECHNICAL BACKGROUND

Self-propelled robotic tools such as robotic lawnmowers have become widely used. One conceivable method of detecting a collision between the robotic tool and another object is to obtain a measure of motor currents fed to electric motors driving the robotic tool and comparing those measures with expected motor currents as derived from inertia measurement unit, IMU, data, using a prediction algorithm. If for instance it is noted that the robotic tool moves much less than expected with regard to the motor currents, a collision with a foreign object may be detected.

A general problem associated with such methods self-propelled robotic tools is how to make them more reliable, for instance falsely detecting a collision to a lesser extent.

SUMMARY OF THE INVENTION

One object of the present disclosure is therefore to provide a more reliable collision detection method. This object is achieved by means of a method as defined in claim 1. More specifically, in a method of the initially mentioned kind, the prediction algorithm parameters are repeatedly updated based on the current error exceeding a threshold.

This allows the prediction algorithm to adapt to circumstances where the robotic tool is used. For instance, in the case of a robotic lawn mower, if the lawn mower operates in thick, tough grass, the prediction algorithm can be adapted to compensate for this factor, such that false detections of collisions are not made simply by driving on the grass. This may also compensate for other factors such as ageing of the robotic tool driving means, etc., making the robotic tool more reliable.

Therefore, a general collision method algorithm can adapt to different circumstances and allow more reliable and efficient operation.

In a first control loop, a positive current error exceeding a positive threshold may be registered as an instance of a large positive error, while a negative current error exceeding a negative threshold may be registered as an instance of a large negative error.

A large positive error may increment an error counter while a large negative error decrements the same.

Then, in a second control loop, the prediction algorithm parameters may be updated based on the number of large positive and large negative current errors detected since a previous iteration of the second control loop. A positive reading of the error counter, exceeding a positive error count threshold, may update the prediction algorithm parameters in a first manner, while a negative reading of the error counter exceeding a negative error count threshold may update the prediction algorithm parameters in a second manner, contrary to the first manner.

At the end of the iteration of the second control loop, the error counter may be reset.

Typically, the first loop may be repeated between 1000 and 500000 times between every repeat of the second loop, and the first loop may be repeated between 100 and 5000 times per second.

The method may be implemented in a robotic garden tool, or agricultural tool, typically in a robotic lawn mower.

The prediction algorithm parameters may also be adjusted based on location of garden and earlier registered ground surface conditions detected.

The present disclosure also considers a self-propelled robotic tool comprising a control arrangement configured to carry out the above method. Generally, the robotic tool then includes corresponding devices or modules and is configured to carry out the steps of the above-defined method.

Further, the robotic tool may use at least one positioning data sensor, e.g. GPS (Global Positioning System), RTK (Real-Time Kinematics), or high-precision local positioning systems such as optical positioning, UWB (Ultra-Wideband), BLE (Bluetooth) positioning services, to adjust for variations in ground surface conditions based on location and time, and may use weather conditions such as humidity, temperature, rain, and ice to further adjust for weather dependent ground surface friction and environmental factors.

BRIEF DESCRIPTION OF THE DRAWINGS

FIG. 5 illustrates flow charts describing the updating of a prediction algorithm.

DETAILED DESCRIPTION

Figure 1:
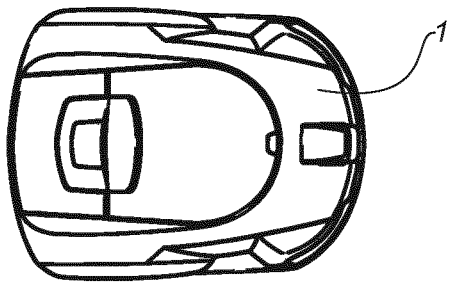
FIG. 1 shows a top view of a self-propelled robotic tool in the form of a lawnmower.

Self-propelled robotic tools, for instance in the form of robotic lawnmowers 1 as shown in FIG. 1, have become widely used. The present disclosure may also be useful in connection with robotic tools configured as robotic vacuum cleaners, golf ball collecting tools or any other type of robotic tool that operates over a working area. Typically, such robotic tools intermittently connect to a charging station (not shown).

The present disclosure relates to methods and arrangements in such a robotic tool for detecting a collision with another object as the robotic tool moves. If a collision is detected, the robotic tool should carry out some measures, for instance moving back and changing its direction to find an unobstructed path.

Figure 2:
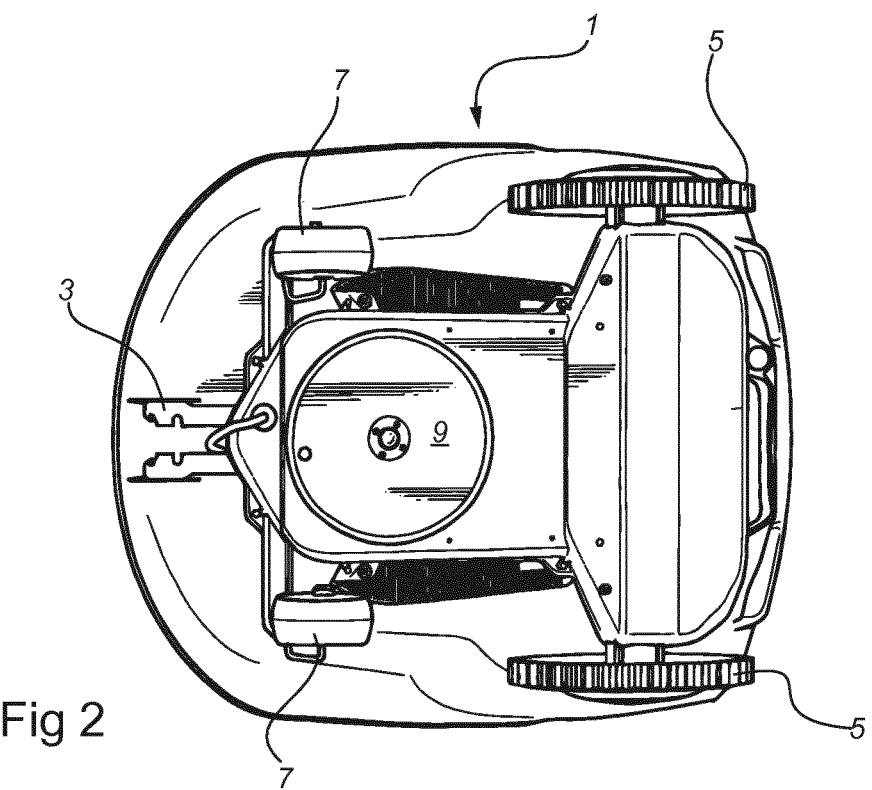
FIG. 2 shows components on the bottom side of the lawnmower.

FIG. 2 shows the bottom side of a robotic tool 1. Typically, the robotic tool has a connector arrangement 3, that allows the robotic tool 1 to intermittently connect to a charging station. In the illustrated case two driving wheels 5 are located at the rear end of the robotic tool and two swiveling wheels 7 are located in the front. The driving wheels 5 may typically each be individually driven by an electric motor, while the swiveling wheels 7 may be undriven. However, other configurations are possible, and may be preferred in some cases. For instance, a four-wheel drive configuration with a driven wheel in each corner of the robotic tool may be considered. A blade 9 for mowing grass is also shown.

Figure 3:
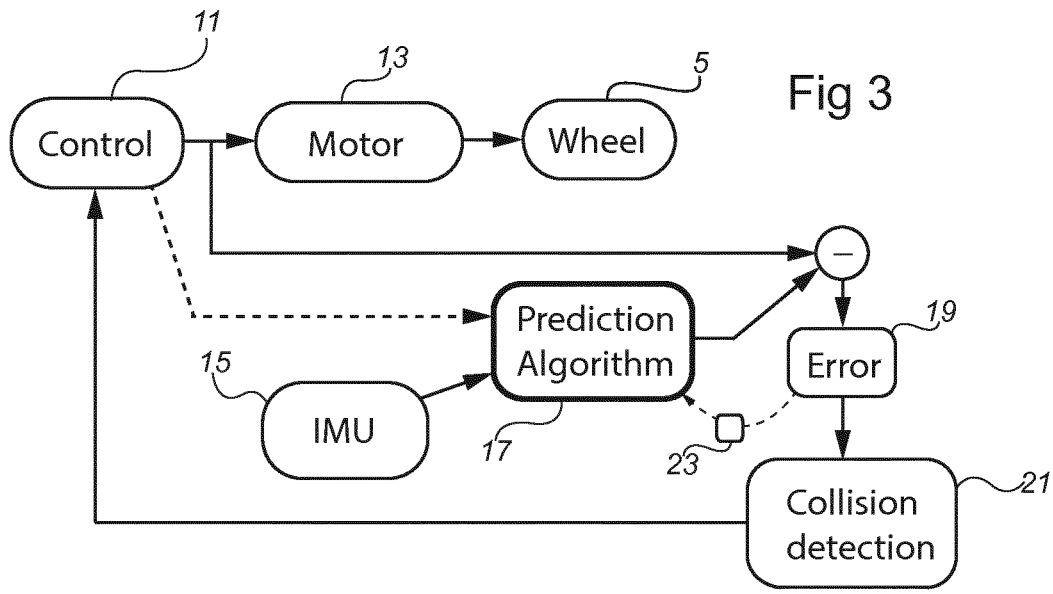
FIG. 3 illustrates schematically components in a collision detection arrangement.

Components used to control wheel movement and to detect collisions are schematically illustrated in FIG. 3. The robotic working tool moves over a covered area as controlled by a control unit 11, typically devised as a computer. The control unit 11 controls the motors 13, each running a wheel 5, thereby moving the robotic working tool in accordance with a navigating scheme which is not discussed further.

The robotic tool comprises an inertia measurement unit, IMU, 15 which generally obtains data regarding the robotic working tool's movement. The IMU may thus comprise e.g. accelerometers and wheel movement sensors, and can produce one or more parameters in the group speed, roll, pitch, wheel movement, etc.

Further, the robotic tool may use sensors (GPS, RTK, or high-precision local positioning systems such as optical positioning, UWB, BLE positioning services), to adjust for variations in ground surface conditions based on location and time, and may use weather conditions such as humidity, temperature, rain, and ice to further adjust for weather dependent ground surface friction and environmental factors.

Based on data retrieved, it is possible for each wheel to obtain a prediction of the motor current needed to produce the sensed movement. This is done by means of a prediction algorithm 17. For instance, the prediction may use a simple linear combination of parameters retrieved from the IMU 15 and optionally from the control unit 11.

$$i_{predicted} = c_1 * speed + c_2 * speed\_requested + c_3 * pitch + c_4 * roll + i_{offset}$$

In the above example, measured speed, pitch and roll from the IMU is used as well as the requested speed as retrieved from the control unit, and a linear combination of those parameters and a current offset, $i_{offset}$, equals the predicted needed motor current. It should be noted that such a prediction algorithm may of course be devised in other ways.

The predicted motor current is compared to the actual current used, and the difference constitutes an error 19, which is used in a collision detection unit 21. Typically, if the collision detection unit 21 senses that the actually used motor current is much higher than the predicted current, a collision may be indicated. This may be done for each wheel individually, or a joint detection scheme may be used. If a collision is detected, the control unit 11 is informed accordingly, such that it may carry out suitable measures, such as reversing the robotic work tool, changing its heading, and noting that there is an obstacle in the area in question in its navigation system.

It should be noted that prediction algorithm 17 and the collision detection 21 may most likely be software-implemented and integrated with the control unit 11, although drafted as separate units here for illustration purposes.

The present disclosure suggests an arrangement 23 updating the prediction algorithm 17 based on the determined error 19 to achieve an improved robotic working tool behavior.

Figure 4:
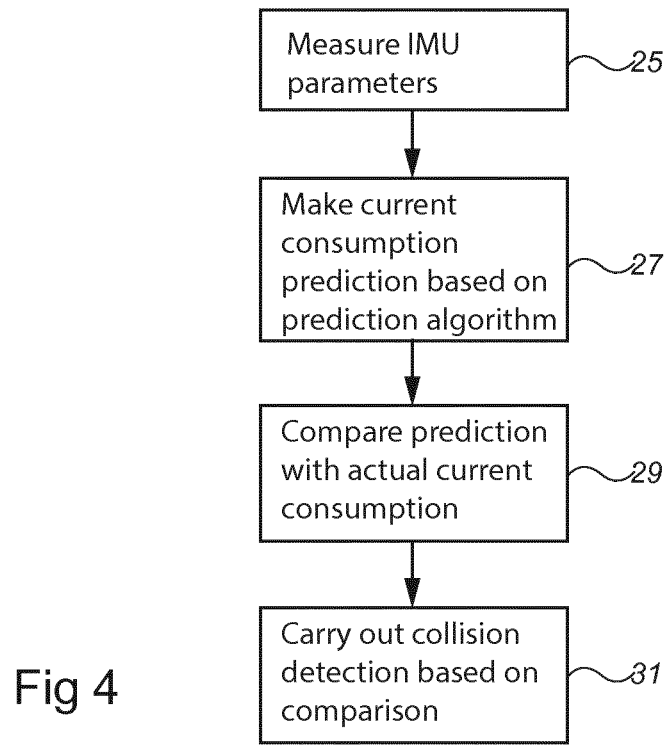
FIG. 4 shows a flow chart of a collision detection method

FIG. 4 summarizes in a flow chart a very basic method for detecting a collision. IMU parameters are measured 25 and based on those parameters a predicted motor current is determined 27. This predicted current is compared 29 with the actual current. A collision detection procedure is carried out 31, and if the actual current is much higher than the predicted current, a collision may be detected.

The prediction algorithm 17 of FIG. 4 has before typically been adjusted over a number of test runs to correctly determine a collision and has then been the same for all robotic work tools produced in that release.

That scheme however, is not capable of dealing with some varying conditions that the robotic work tool is exposed to. For instance, wet, recently cut grass can become stuck under the robotic work tool, thereby increasing its weight, or can be stuck on the driving wheels changing the robotic tools characteristic. More importantly, the grass to be cut can have significantly different properties. The comparatively soft grass seed mixes often used in Europe will give a lesser driving resistance than tougher grass such as Tall Fescue, which is increasingly more common in North America.

If the determined current prediction value under normal conditions when no collision takes place is not close to the real power consumption of the motors, the robotic work tool will either detect false collisions or will fail to detect real collisions.

In the case of false collisions, a robotic working tool in the form of lawn mower will move over the lawn in an inefficient manner, and may not even reach the entire area, much likely preferring already cut areas or areas with softer grass.

Should the lawn mower instead fail to detect a real collision, the lawn mower will slip and may wear down spots of the lawn with its wheels. Further, less efficient cutting may take place. While it would be possible to allow different settings e.g. determined by grass type, soil, stone, gravel or other garden surfaces, this is difficult for an end user to handle in a correct manner.

The present method instead allows the collision detection algorithm to adapt itself to the specific preconditions that exists for any given robotic work tool and environment. In the example of a robotic lawn mower, the collision detection adapts to the garden where it is used and the type of grass therein. Further, it can adapt to temporary or seasonal conditions such as wet grass being stuck under the lawn mower or grass being tougher during parts of the growth season. It may also adapt to long term changes in the properties of the lawn mower itself, such as ageing.

When produced, every robotic work tool may have a default algorithm, which may work better or worse as the robotic work tool starts to run in its specific installation. After some running time, typically about an hour, the algorithm will have adapted itself to the grass in the garden for example, and the mower will then have an improved collision detection, allowing it to run efficiently in the garden. As the environment changes over the season (more or less grass growth) or over the mower life span (wear on motors), the collision detection algorithm may adapt to those changing conditions.

FIG. 5 illustrates the prediction algorithm 17 updating sequence that can be divided into a measuring loop 33 and an updating loop 35.

The measuring loop 33 is repeated relatively frequently, for instance once every millisecond, which of course is only an example. In the measuring loop 33, the current consumption is predicted 36 based on the prediction algorithm 17. The predicted current consumption value is compared with the actual consumption to provide an error. If determined in a test 39 that the error is greater than a threshold, in the illustrated case 50 mA, i.e. a large positive error, an error category counter, error_cat, 38 is incremented 41. If it is determined on the other hand in a test 43 that the error is more negative than another threshold, in the illustrated case −50 mA, i.e. there is a large negative error, the error category counter, error_cat, 38 is decremented 45. The thresholds+1-50 mA is only an example and should be selected depending on other parameters of the motor and driving system, for instance. The threshold should in most cases be lower than a threshold used to detect a collision.

If the measuring loop 33 frequently experiences large positive errors and no or few negative errors, the error category counter 38 will quickly reach a great positive value. If instead the errors are negative, the error category counter 38 will instead reach a large negative value. In case the prediction algorithm 17 is relatively accurate or mixes positive and negative errors, the error category counter will have a low value.

The updating loop 35 runs with a much lower frequency than the measuring loop 33, in the illustrated case every second minute, although this is just an example. In most possible embodiments, the measuring loop 33 runs several thousand times for every cycle of the updating loop 35.

In the updating loop 35 it is tested 47 whether the error category counter 38 is higher than a positive threshold, in the illustrated case 12000. If this is the case, a prediction algorithm setting is adjusted 49 in one direction. Typically, the current offset term $i_{offset}$ may be increased 5 mA. If on the other hand the category counter 38 is lower than a negative threshold, in the illustrated case more negative than −12000, the prediction algorithm setting is adjusted in the other direction, the offset term being decreased in the same way. In any case, the error category counter 38 may subsequently be reset 55. This starts a new time window to base an update on.

The terms positive and negative error of course depends on whether the predicted current is subtracted from the actual current or vice-versa. As the skilled person realizes, the parameters are updated such that a better prediction is made.

The coefficients of the algorithm could be stored in non-volatile memory so that the mower remembers its adapted algorithm in between power cycles.

The present disclosure is not restricted to the above-described examples and may be varied and altered in different ways within the scope of the appended claims.

The invention claimed is:

1. A method in a self-propelled robotic tool comprising at least one driving wheel driven by an electric motor, the method detecting a collision with another object and comprising:
   measuring IMU parameters,
   predicting required motor currents based on the measured parameters and a prediction algorithm controlled by prediction algorithm parameters,
   comparing predicted currents with actual currents to provide a current error, and
   carrying out a collision detection based on the current error, and repeatedly updating the prediction algorithm parameters based on the current error exceeding a threshold.

2. The method according to claim 1, wherein in a first control loop positive current error exceeding a positive threshold is registered as an instance of a large positive error, while a negative current error exceeding a negative threshold is registered as an instance of a large negative error.

3. The method according to claim 2, wherein a large positive error increments an error counter while a large negative error decrements the error counter.

4. The method according to claim 3, wherein a positive reading of the error counter exceeding a positive error count threshold updates the prediction algorithm parameters in a first manner, and a negative reading of the error counter exceeding a negative error count threshold updates the prediction algorithm parameters in a second manner, contrary to the first manner.

5. The method according to claim 4, wherein at the end of the iteration of the second control loop, the error counter is reset.

6. The method according to claim 2, wherein in a second control loop the prediction algorithm parameters are updated based on the number of large positive and large negative current errors detected since a previous iteration of the second control loop.

7. The method according to claim 6, wherein the first loop is repeated between 1000 and 500000 times between every repeat of the second loop.

8. The method according to claim 7, wherein the first loop is repeated between 100 and 5000 times per second.

9. The method according to claim 1, wherein the method is carried out in a robotic garden, or agricultural tool.

10. The method according to claim 1, wherein the prediction algorithm parameters are adjusted based on location of garden and earlier registered ground surface conditions detected.

11. The method according to claim 1, wherein the method is carried out in a robotic lawn mower.

12. A self-propelled robotic tool comprising a at least one driving wheel driven by an electric motor, an inertia measurement unit, IMU, and a collision detection arrangement configured to detect a collision of the self-propelled robotic tool with another object:
   obtaining measured IMU parameters from the IMU,
   predicting required motor currents based on the measured parameters and a prediction algorithm,
   comparing predicted currents with actual currents to provide a current error, and
   carrying out a collision detection with a collision detection unit based on the current error, wherein the collision detection arrangement comprises an updating unit configured for repeatedly updating the prediction algorithm parameters based on the current error exceeding a threshold.

13. The self-propelled robotic tool according to claim 12, wherein the self-propelled robotic tool uses at least one positioning data sensor to adjust for variations in ground surface conditions based on location and time.

14. The self-propelled robotic tool according to claim 13, wherein the self-propelled robotic tool uses weather conditions and humidity, temperature, rain, ice to further adjust for weather dependent ground surface friction and environmental factors.

* * * * *

UNITED STATES PATENT AND TRADEMARK OFFICE
CERTIFICATE OF CORRECTION

PATENT NO. : 11,963,478 B2
APPLICATION NO. : 16/972411
DATED : April 23, 2024
INVENTOR(S) : Jonas Holgersson Page 1 of 1

It is certified that error appears in the above-identified patent and that said Letters Patent is hereby corrected as shown below:

In the Claims

In Column 5, Claim 2, Line 59, "loop positive current" should read -- loop a positive current --

In Column 6, Claim 12, Line 39, "another object:" should read -- another object by: --

Signed and Sealed this
Twenty-sixth Day of November, 2024

Katherine Kelly Vidal
*Director of the United States Patent and Trademark Office*